United States Patent
Tokumaru et al.

(10) Patent No.: US 9,063,276 B2
(45) Date of Patent: *Jun. 23, 2015

(54) POLARIZING LENS CONSTITUTED OF AROMATIC POLYCARBONATE

(75) Inventors: Terutaka Tokumaru, Tokyo (JP); Ken Shimomai, Tokyo (JP); Katunori Suzuki, Tokyo (JP); Kyousuke Nakamura, Tokyo (JP); Masaki Yagoura, Saitama (JP); Akio Ohkubo, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 28 days.

This patent is subject to a terminal disclaimer.

(21) Appl. No.: 13/701,161

(22) PCT Filed: Jun. 9, 2011

(86) PCT No.: PCT/JP2011/063197
§ 371 (c)(1),
(2), (4) Date: Nov. 30, 2012

(87) PCT Pub. No.: WO2011/155550
PCT Pub. Date: Dec. 15, 2011

(65) Prior Publication Data
US 2013/0070196 A1    Mar. 21, 2013

(30) Foreign Application Priority Data
Jun. 11, 2010   (JP) ................. 2010-134180

(51) Int. Cl.
*G02B 1/08* (2006.01)
*G02C 7/12* (2006.01)
(Continued)

(52) U.S. Cl.
CPC .. *G02B 1/08* (2013.01); *G02C 7/12* (2013.01); *B32B 37/02* (2013.01); *Y10T 156/1048* (2015.01); *G02B 5/3033* (2013.01)

(58) Field of Classification Search
USPC ........... 428/1.31, 1.33, 412; 351/49; 359/601; 156/224
See application file for complete search history.

(56) References Cited

U.S. PATENT DOCUMENTS

| 5,051,309 A | 9/1991 | Kawaki et al. |
| 5,474,731 A | 12/1995 | Morikawa et al. |

(Continued)

FOREIGN PATENT DOCUMENTS

| EP | 0395019 | 10/1990 |
| JP | 3-39903 | 2/1991 |

(Continued)

OTHER PUBLICATIONS

Search report from E.P.O. In EP 11792507.3, mail date is Nov. 7, 2013.

(Continued)

*Primary Examiner* — Thao T Tran
(74) *Attorney, Agent, or Firm* — Greenblum & Bernstein, P.L.C.

(57) ABSTRACT

Provided is a polarizing lens which is excellent especially in terms of impact resistance, appearance, and prevention of eye strain and which has high precision of the surface shape. The polarizing lens is formed by laminating a sheet of an aromatic polycarbonate through an adhesive layer to each surface of a film having polarizing properties, curving the resultant laminate so as to impart spherical or aspherical surfaces thereto to obtain a polarizing sheet, inserting the polarizing sheet into a mold, and injecting an aromatic polycarbonate, wherein the polarizing sheet is obtained through the laminating so that the stretch axis of one of the aromatic-polycarbonate sheets is perpendicular to the absorption axis of the film having the polarizing properties.

2 Claims, 1 Drawing Sheet

(51) Int. Cl.
  B32B 37/02 (2006.01)
  G02B 5/30 (2006.01)

(56) References Cited

U.S. PATENT DOCUMENTS

| | | | |
|---|---|---|---|
| 5,702,813 A | 12/1997 | Murata et al. | |
| 7,118,806 B2 * | 10/2006 | Nishizawa et al. | 428/412 |
| 2012/0206689 A1 * | 8/2012 | Ohkubo et al. | 351/44 |
| 2013/0010253 A1 * | 1/2013 | Tokumaru et al. | 351/49 |

FOREIGN PATENT DOCUMENTS

| | | |
|---|---|---|
| JP | 6-300916 | 10/1994 |
| JP | 8-52817 | 2/1996 |
| JP | 8-313701 | 11/1996 |
| JP | 2005-196006 | 7/2005 |
| JP | 2007-163570 | 6/2007 |
| JP | 2009-160830 | 7/2009 |
| WO | 2011/049108 | 4/2011 |
| WO | WO 2011/049108 | 4/2011 |

OTHER PUBLICATIONS

Search report from International Application No. PCT/JP2011/063197, mail date is Jul. 12, 2011.

* cited by examiner

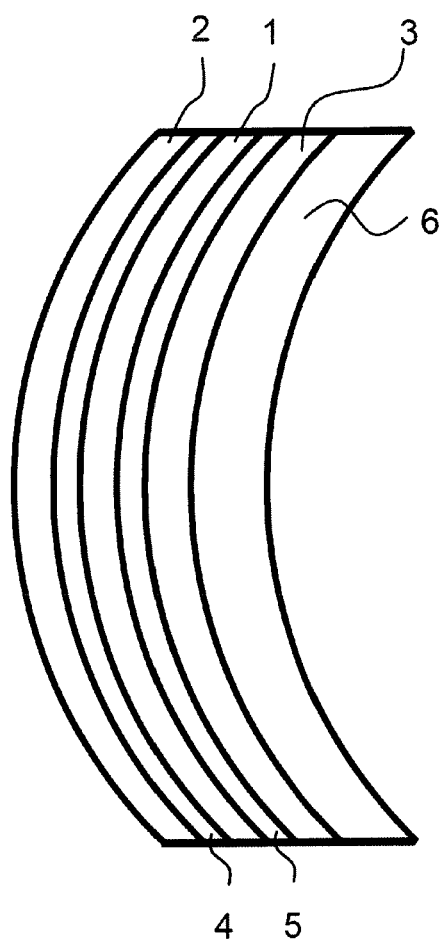

ical or aspherical shape of sunglasses, goggles or the like, a coloring interference stripe tends to easily occur due to retardation. Such a coloring interference stripe has problems such as poor appearance and causing eye strain.

POLARIZING LENS CONSTITUTED OF AROMATIC POLYCARBONATE

TECHNICAL FIELD

The present invention relates to a polarizing lens constituted of an aromatic polycarbonate, which is formed by injecting the aromatic polycarbonate to one of the surfaces of a polarizing sheet.

BACKGROUND ART

Polarizing sheets constituted of a polycarbonate have excellent impact resistance and are light, and therefore are used for liquid crystal displays as well as windows of buildings, sunroofs of cars, and sunglasses or goggles to be used for marine sports, winter sports, fishing, etc.

Polarizing sheets, which are obtained by laminating an aromatic polycarbonate sheet as a protection layer through an adhesive layer to each surface of a polarizing film obtained by stretching a polyvinyl alcohol film and staining it with a dichroism pigment (hereinafter arbitrarily referred to as "aromatic polycarbonate polarizing sheet"), particularly have excellent impact resistance and also have high heat resistance, and therefore are used for polarizing lenses for sunglasses or goggles obtained from a curving process or injection molding process.

However, since aromatic polycarbonate has a high photoelastic constant, when a curving process is applied to a spherical or aspherical shape of sunglasses, goggles or the like, a coloring interference stripe tends to easily occur due to retardation. Such a coloring interference stripe has problems such as poor appearance and causing eye strain.

Further, in the case of a polarizing lens obtained by subjecting an aromatic polycarbonate polarizing sheet to a curving process to provide a spherical or aspherical shape, distortion of an image may be caused by unevenness of the thickness of the aromatic polycarbonate polarizing sheet, and there are problems such as poor appearance and causing eye strain.

Regarding retardation caused at the time of applying a curving process, an aromatic polycarbonate polarizing sheet, whose coloring interference stripe has been hidden from view by subjecting an aromatic polycarbonate sheet to be used for a protection layer to a stretching process to cause a large retardation in advance (hereinafter arbitrarily referred to as "stretched polycarbonate polarizing sheet"), is known (Patent Document 1), and is used for polarizing lens products which have excellent appearance and are excellent in saving eye strain.

Meanwhile, a polarizing lens, which is formed by subjecting the afore-mentioned stretched polycarbonate polarizing sheet to a curving process to provide a spherical or aspherical shape, inserting the resultant stretched polycarbonate polarizing sheet into a mold and injecting an aromatic polycarbonate thereto, for the purpose of improving impact resistance more than that of a polarizing lens formed by subjecting the afore-mentioned stretched polycarbonate polarizing sheet to a curving process or forming a corrective lens having a focal refractive power (hereinafter arbitrarily referred to as "aromatic polycarbonate polarizing lens"), is known (Patent Document 2).

In the case of the aromatic polycarbonate polarizing lens, an aromatic polycarbonate is injected and filled in a mold, and therefore, there is an advantage that unevenness of the thickness of the inserted stretched polycarbonate sheet becomes invisible. Therefore, the aromatic polycarbonate polarizing lens is used for lens products without focal refractive power which are particularly excellent in impact resistance, appearance and prevention of eye strain.

In the case of a lens obtained by filling a mold with a thermosetting resin or thermoplastic resin as in the case of the aromatic polycarbonate polarizing lens, the shape of each surface and the thickness of the formed lens can be freely set by suitably setting each surface shape of molds for the lens surfaces and the distance between the surfaces. Therefore, the surface shapes of molds and the distance between the surfaces are set based on the optical design so that the focal refractive power, prism diopter and image distortion of the formed lens become desired values.

In many cases, the surface shape of the formed lens is the same as the surface shape of the mold contacted at the time of forming, but when the surface shape of the lens requires very high precision, in order to compensate decrease of the lens thickness and change of the surface shape due to volume contraction at the time of solidification of the thermosetting resin or thermoplastic resin filled in a mold, the surface shapes of molds for both the surfaces and the distance between the surfaces may be suitably and finely adjusted.

As a mold to be used for the process of curving the aromatic polycarbonate polarizing sheet, a mold having the same shape as the surface shape of a surface opposite to a surface contacting aromatic polycarbonate injected in the aromatic polycarbonate polarizing lens finally obtained is used.

Further, among molds to be used for injection molding of the aromatic polycarbonate polarizing lens, a mold for the stretched polycarbonate polarizing sheet side also has the same shape as the surface shape of the stretched polycarbonate polarizing sheet side in the aromatic polycarbonate polarizing lens finally obtained, and the other mold to be used for injection molding has the same shape as a surface shape by which the focal power and the prism diopter in the aromatic polycarbonate polarizing lens finally obtained based on the optical design can have desired values.

For example, when it is desired to finally obtain an aromatic polycarbonate polarizing lens, which does not have a focal refractive power or prism diopter, and in which the surface of the stretched polycarbonate polarizing sheet side is a spherical surface having a base curve of 8, the curving process may be carried out twice or three times or more. However, the shape of a mold to be used for the final curving process is a spherical surface having a base curve of 8; among molds to be used for injection molding, the shape of a mold for the stretched polycarbonate polarizing sheet side is also a spherical surface having a base curve of 8; and the surface shape of the other mold to be used for injection molding is a spherical surface having a base curve of 8 or slightly greater than 8, wherein the center position of the spherical surface is slightly different with respect to the mold for the stretched polycarbonate polarizing sheet side, that is, decentered.

Further, for example, when it is desired to finally obtain an aromatic polycarbonate polarizing lens, which does not have a focal refractive power or prism diopter, and in which the surface of the stretched polycarbonate polarizing sheet side is an elliptical surface having a base curve in the horizontal direction of 6 and a base curve in the vertical direction of 4, the curving process may be carried out twice or three times or more. However, the shape of a mold to be used for the final process is an elliptical surface having a base curve in the horizontal direction of 6 and a base curve in the vertical direction of 4; among molds to be used for injection molding, the shape of a mold for the stretched polycarbonate polarizing sheet side is also an elliptical surface having a base curve in the horizontal direction of 6 and a base curve in the vertical direction of 4; and the shape of the other mold to be used for injection molding is an elliptical surface having a base curve in the horizontal direction of 6 or slightly greater than 6 and a base curve in the vertical direction of 4 or slightly greater than 4.

Moreover, examples of the surface shape of the aromatic polycarbonate polarizing lens include quadric curved surfaces such as a spherical surface, an elliptical surface and a paraboloidal surface as well as high-order curved surfaces such as a quartic curved surface, and the curvature in the horizontal direction may be different from the curvature in the vertical direction. However, there is a case where the surface shape of the aromatic polycarbonate polarizing lens after injection molding is significantly different from the surface shape of the mold, and the type of difference varies.

Regarding the stretched polycarbonate polarizing sheet, it is known that when forming the aromatic polycarbonate polarizing lens using a mold whose surface shape is a spherical surface, if the stretched polycarbonate polarizing sheet, wherein the stretch of the aromatic polycarbonate sheet at the side where aromatic polycarbonate is injected has been eliminated or decreased, is used, the absolute value of the difference between the base curve in the vertical direction and the base curve in the horizontal direction of the formed polarizing lens (hereinafter arbitrarily referred to as "base curve anisotropy") is reduced (Patent Document 3).

In the case of the aromatic polycarbonate polarizing lens using the stretched polycarbonate polarizing sheet, wherein the stretch of the aromatic polycarbonate sheet at the side where aromatic polycarbonate is injected has been eliminated or decreased (hereinafter arbitrarily referred to as "one-side stretched polycarbonate polarizing sheet"), the surface shape of the lens can be formed with very high precision. Therefore, the lens is used for products, which are particularly excellent in impact resistance, appearance and prevention of eye strain, and in which precision of the surface shape of the lens is high.

On the surface of the aromatic polycarbonate polarizing lens formed in this way, a hard coating, an antireflection film and the like are suitably formed, and then the lens is fixed to a frame by edging, hole making, screw tightening, etc., thereby providing sunglasses or goggles.

PRIOR ART DOCUMENTS

Patent Documents

Patent Document 1: Japanese Laid-Open Patent Publication No. 1103-39903
Patent Document 2: Japanese Laid-Open Patent Publication No. H08-52817
Patent Document 3: Japanese Laid-Open Patent Publication No. H08-313701

SUMMARY OF THE INVENTION

Problems to be Solved by the Invention

As described above, in the case of the aromatic polycarbonate polarizing lens using the one-side stretched polycarbonate polarizing sheet, the surface shape of the lens can be formed with very high precision, and therefore, the lens is used for products, which are particularly excellent in impact resistance, appearance and prevention of eye strain, and in which precision of the surface shape of the lens is high.

However, the problem is that, even if the one-side stretched polycarbonate polarizing sheet is used, the surface shape significantly varies depending on processing conditions of the curving process, injection molding, hard coating treatment, etc., and a surface shape with desired precision has not been successfully formed with heating temperatures and heating times suitable for respective processes such as the curving process, injection molding and hard coating treatment.

Moreover, the surface shape of the aromatic polycarbonate polarizing lens using the one-side stretched polycarbonate polarizing sheet after injection molding is different from the surface shape of the injection mold, i.e., the desired surface shape obtained based on the optical design, and further varies depending on various processing conditions of the curving process, injection molding, hard coating treatment, etc. Due to this complication, it has not been comprehended how the surface shape changes depending on such individual processing conditions, and it has not been predicted whether or not suitable selection of these individual processing conditions would lead to the surface shape with desired precision.

In the case of the aromatic polycarbonate polarizing lens using the stretched polycarbonate polarizing sheet, needless to say, the surface shape with desired precision has not been successfully formed. When the surface shape of the polarizing lens has extremely low precision, the problem is that the polarizing lens cannot be fixed to the frame after edging because of the difference between the shape of the formed polarizing lens and the shape of the frame.

For example, in the case of the polarizing lens whose surface shape is a spherical surface having a base curve of 8, the problem is that when the base curve anisotropy of the formed polarizing lens exceeds 0.25, it is difficult to fix the lens to the frame. Moreover, regarding the influence of shape precision, it should be noted that when the base curve anisotropy of the formed polarizing lens increases, the problem is that the prescription of Resolving Power in the American Standard ANSI-Z87.1 regarding protective glasses (hereinafter arbitrarily referred to as "resolution") is not satisfied. For example, in the case of a polarizing lens whose surface shape is a spherical surface having a base curve of 8, when the base curve anisotropy of the formed polarizing lens exceeds roughly about 0.1, the resolution becomes less than 20, and this does not satisfy the American Standard ANSI-Z87.1.

There is no prior art document regarding the relationship between the aforementioned resolution and the shape precision of the polarizing lens. The present inventors diligently made researches and found the relationship, wherein when the shape precision of the formed polarizing lens is low, the resolution is low, and when the shape precision of the formed polarizing lens is high, the resolution is high, and also found that when the surface shape precision of the polarizing lens is significantly increased and the base curve anisotropy is set to roughly about 0.1 or less, the resolution becomes 20 or more.

Means for Solving the Problems

The present invention relates to a polarizing lens, which is formed by laminating a sheet of an aromatic polycarbonate through an adhesive layer to each surface of a film having polarizing properties, curving the resultant laminate so as to impart spherical or aspherical surfaces thereto to obtain a polarizing sheet, and injecting an aromatic polycarbonate to one of the surfaces of the polarizing sheet, wherein the retardation value of the aromatic polycarbonate sheet positioned at the light incidence side of the polarizing sheet is 2,000 nm or more and less than 20,000 nm, and wherein the stretch axis of the aromatic polycarbonate sheet is perpendicular to the absorption axis of the film having polarizing properties.

The present invention also relates to a polarizing lens, which is formed by laminating a sheet of an aromatic polycarbonate through an adhesive layer to each surface of a film having polarizing properties, curving the resultant laminate so as to impart spherical or aspherical surfaces thereto to obtain a polarizing sheet, and injecting an aromatic polycarbonate to one of the surfaces of the polarizing sheet, wherein the retardation value of the aromatic polycarbonate sheet is 2,000 nm or more and less than 20,000 nm, wherein the stretch axis of the aromatic polycarbonate sheet positioned at the light incidence side is parallel to the absorption axis of the film having the polarizing properties, and wherein the stretch axis of the aromatic polycarbonate sheet positioned at the light exit side is perpendicular to the absorption axis of the film having the polarizing properties.

Advantageous Effect of the Invention

According to the present invention, an aromatic polycarbonate polarizing lens having high shape precision can be stably provided.

Further, regarding a polarizing lens whose surface shape is a spherical surface, a polarizing lens having a base curve anisotropy of 0.25 or less can be stably provided, and in addition, a polarizing lens having a resolution of 20 or more can be stably provided according to the present invention.

BRIEF DESCRIPTION OF THE DRAWINGS

FIG. 1 shows a cross sectional view of an aromatic polycarbonate polarizing lens according to the present invention.

EMBODIMENT FOR CARRYING OUT THE INVENTION

The aromatic polycarbonate polarizing lens of the present invention will be described below.

Firstly, a resin film as a base material for a polarizing film is directionally stretched and immersed in a dye liquor containing a dye such as iodine, a dichroism pigment or the like to disperse the iodine or dichroism pigment in the base resin, thereby obtaining a polarizing film to which polarization properties have been imparted.

As the resin as the base material for the polarizing film to be used in this case, polyvinyl alcohols may be used. As the polyvinyl alcohols, polyvinyl alcohol (hereinafter referred to as "PVA"), PVA in which a slight amount of the acetic acid ester structure remains, and PVA derivatives, or polyvinyl formal that is an analog, polyvinyl acetal, saponified ethylene-vinyl acetate copolymer, etc. are preferred, and PVA is particularly preferred.

Further, regarding the molecular weight of a PVA film, from the viewpoint of stretchability and film strength, the weight-average molecular weight is preferably 50,000 to 500,000, and particularly preferably 150,000 to 300,000. Further, as a dye for the polarizing film to be used in this case, from the viewpoint of staining properties with respect to the PVA film and heat resistance, a direct dye consisting of an azo dye having a sulfonic acid group is preferred. The scaling factor of stretching of the PVA film is preferably 2- to 8-fold, and particularly preferably 3- to 5-fold from the viewpoint of the dichroic ratio and film strength after stretching.

Next, a protection layer consisting of an aromatic polycarbonate sheet is laminated to each surface of the polarizing film through an adhesive layer. As a resin material for the aromatic polycarbonate sheet to be used in this case, from the viewpoint of the film strength, heat resistance, durability or curving workability, polymers produced according to the well-known method from a bisphenol compound typified by 2,2-bis(4-hydroxyphenyl)alkane or 2,2-(4-hydroxy-3,5-dihalogenophenyl)alkane are preferred, and the polymer skeleton thereof may include a structural unit derived from a fatty acid diol or a structural unit having ester bonds. In particular, an aromatic polycarbonate induced from 2,2-bis(4-hydroxyphenyl)propane is preferred.

Regarding the molecular weight of the aromatic polycarbonate sheet, from the viewpoint of forming of the sheet itself, the viscosity-average molecular weight is preferably 12,000 to 40,000, and from the viewpoint of the film strength, heat resistance, durability or curving workability, the viscosity-average molecular weight is particularly preferably 20,000 to 35,000. Regarding the retardation value of the aromatic polycarbonate sheet, from the viewpoint of suppression of a coloring interference stripe, the lower limit thereof is preferably 2,000 nm or higher. The upper limit thereof is not particularly limited, but from the viewpoint of the film production, the upper limit is preferably 20,000 mu or lower, and particularly preferably 4,000 nm or higher and 20,000 nm or lower. When the retardation value is higher, a coloring interference stripe is not easily generated, but there is a disadvantage that the surface shape precision is lower.

Examples of the method for measuring the retardation value of the aromatic polycarbonate sheet include a method in which the sheet is placed between crossed nicols or paralleled nicols to measure a transmission spectrum of visible light and calculation is carried out based on the peak valley of the transmission spectrum.

However, in the case of the aromatic polycarbonate polarizing lens of the present invention, the surface shape precision can be improved. Therefore, even if the retardation value is higher, the surface shape precision can be improved. Regarding the thickness of respective protection layers made of aromatic polycarbonate for the surfaces, from the viewpoint of the film strength, heat resistance, durability or curving workability, the thickness is preferably in the range of 50 μm to 1.5 mm, and particularly preferably in the range of 100 μm to 800 μm.

When using the aromatic polycarbonate sheet having a high retardation value at the light incidence side of the polarizing film, i.e., the opposite side of the human eye, a coloring interference stripe is not easily generated.

The aromatic polycarbonate sheet is formed by a melt extrusion method, a solution casting method or the like. By stretching the aromatic polycarbonate sheet formed by the above-described method in the flow direction using a stretching machine, an aromatic polycarbonate sheet having a stretch axis in the flow direction can be obtained. Further, by stretching the sheet in the direction perpendicular to the flow direction, i.e., the width direction, an aromatic polycarbonate sheet having a stretch axis in the width direction can be obtained. Use of the aromatic polycarbonate sheet having the stretch axis in the flow direction or width direction obtained in this way allows lamination by the roll-to-roll process, which is excellent in mass production ability.

Further, when forming the aromatic polycarbonate sheet by the melt extrusion method, it is possible to carry out stretching immediately after melt extrusion before cooling the aromatic polycarbonate sheet formed into a sheet by melt extrusion.

As an adhesive to be used for lamination of aromatic polycarbonate on the surfaces of the polarizing film, an acrylic resin-based material, a urethane resin-based material, a polyester resin-based material, a melamine resin-based material, an epoxy resin-based material, a silicone-based material or the like may be used, and in particular, from the viewpoint of the adhesive layer itself or transparency and adhesion properties with respect to aromatic polycarbonate at the time of adhering, a two-component thermosetting urethane resin consisting of polyurethane prepolymer that is a urethane resin-based material and a curing agent is preferred. The aromatic polycarbonate polarizing sheet is obtained in this way.

The aromatic polycarbonate polarizing sheet to be used for the aromatic polycarbonate polarizing lens of the present invention is not limited to the aforementioned aromatic polycarbonate polarizing sheet. It is also possible to use an aromatic polycarbonate polarizing sheet also having the photochromic function, which is prepared using an adhesive in which a photochromic dye is dissolved for adhesion between the polarizing film and the aromatic polycarbonate of the protection layer. The similar effects can be obtained by a polarizing lens formed by subjecting an aromatic polycarbonate sheet to be used for the protection layer of the polarizing film to the stretching treatment in advance to provide a stretched polycarbonate polarizing sheet in which a large retardation has been generated, subjecting the stretched polycarbonate polarizing sheet to the curving process to impart spherical or aspherical surfaces thereto, and inserting the polarizing sheet into a mold and injecting the aromatic polycarbonate thereon in the above-described way.

Next, the stretched polycarbonate polarizing sheet is subjected to the curving process.

Conditions for the curving process of the stretched polycarbonate polarizing sheet are not particularly limited, but the sheet must be curved so that it fits the surface of a mold to be used for injection molding. Further, in the case of the polarizing film, a crack in the stretching direction, so-called film cutting tends to be easily generated in the curving process. In view of these points, the mold temperature in the curving process of the stretched polycarbonate polarizing sheet is preferably a temperature around the glass-transition temperature of the aromatic polycarbonate used for the stretched polycarbonate polarizing sheet, and in addition, immediately prior to the curving process, the temperature is preferably adjusted to a temperature which is equal to or higher than a temperature 50° C. lower than the glass-transition temperature of the aromatic polycarbonate and lower than the glass-transition temperature by means of the preheating treatment, and particularly preferably adjusted to a temperature which is equal to or higher than a temperature 40° C. lower than the glass-transition temperature and lower than a temperature 15° C. lower than the glass-transition temperature.

Next, the aromatic polycarbonate is injected to the stretched polycarbonate polarizing sheet.

Conditions for injection molding are not particularly limited, but excellent appearance is required. From this viewpoint, the mold temperature is preferably a temperature which is equal to or higher than a temperature 50° C. lower than the glass-transition temperature of the aromatic polycarbonate used for the stretched polycarbonate polarizing sheet and lower than the glass-transition temperature, and particularly preferably a temperature which is equal to or higher than a temperature 40° C. lower than the glass-transition temperature and lower than a temperature 15° C. lower than the glass-transition temperature.

Next, the hard coating treatment is carried out.

Materials of hard coating and processing conditions are not particularly limited, but excellent appearance and adhesiveness with respect to the aromatic polycarbonate as the base or inorganic layers such as a mirror coat and an antireflection coat to be subsequently coated are required. From this viewpoint, the burning temperature is preferably a temperature which is equal to or higher than a temperature 50° C. lower than the glass-transition temperature of the aromatic polycarbonate used for the stretched polycarbonate polarizing sheet and lower than the glass-transition temperature, and particularly preferably a temperature which is equal to or higher than a temperature 40° C. lower than the glass-transition temperature and lower than a temperature 15° C. lower than the glass-transition temperature, i.e., a temperature around 120° C. The time required for burning the hard coat is about 30 minutes to 2 hours.

In the case of the conventional stretched polycarbonate polarizing sheet or one-side stretched polycarbonate polarizing sheet, both the stretch axis of the polarizing film and the stretch axis of the aromatic polycarbonate sheet are in the horizontal direction of the polarizing lens. In the case of the aromatic polycarbonate polarizing lens using this polarizing sheet, the base curve in the horizontal direction is bigger and the base curve in the vertical direction is smaller relative to the surface shape of the injection mold, i.e., the desired surface shape. That is, a lens with high shape precision cannot be obtained.

The horizontal direction of the polarizing lens as used herein refers to the direction on the polarizing lens surface that is parallel to the horizontal surface when fixed to sunglasses or goggles and generally corresponds to the absorption axis of the polarizing lens. Further, the vertical direction as used herein refers to the direction perpendicular to the horizontal surface when fixed to sunglasses or goggles and generally corresponds to the transmission axis of the polarizing lens.

The present inventors found that in the case of a stretched polycarbonate polarizing sheet or one-side stretched polycarbonate polarizing sheet in which both the stretch axis of the polarizing film and the stretch axis of the aromatic polycarbonate sheet are in the horizontal direction of the polarizing lens, a lens with high shape precision cannot be obtained, whereas in the case of a stretched polycarbonate polarizing sheet or one-side stretched polycarbonate polarizing sheet in which the stretch axis of the aromatic polycarbonate sheet at the light incidence side or light exit side is in the vertical direction of the polarizing lens, a lens with high shape precision can be obtained.

As a result, it became possible to stably form a polarizing lens whose surface shape is a spherical surface having a base curve anisotropy of 0.25 or less, and in addition, it became possible to form a polarizing lens whose surface shape is a spherical surface having a resolution of 20 or more.

In the Examples below, it is explained that the hard coating treatment is carried out after injection molding, but the heat treatment may be further carried out after injection molding. This heat treatment may be carried out, for example, after the hard coating treatment, or after coating inorganic layers such as a mirror coat and an antireflection coat. Further, by suitably selecting the heating temperature and the heating time of the heat treatment, it may be incorporated into the heat treatment at the time of burning the hard coat.

Regarding conditions for the heat treatment, the heating temperature is preferably a temperature which is equal to or higher than a temperature 50° C. lower than the glass-transition temperature of the aromatic polycarbonate used for the stretched polycarbonate polarizing sheet and lower than the glass-transition temperature, and particularly preferably a temperature which is equal to or higher than a temperature 40° C. lower than the glass-transition temperature and lower than a temperature 15° C. lower than the glass-transition temperature. The heating time is suitably set so that a desired surface shape can be obtained with desired precision. By carrying out the heat treatment under such suitably set conditions, a polarizing sheet having higher shape precision can be formed.

EXAMPLES

Hereinafter, the present invention will be specifically described by way of illustrative examples, but the present invention is not limited thereto.

Comparative Example 1

(a) Stretched Polycarbonate Polarizing Sheet

As a stretched polycarbonate polarizing sheet to be used for an aromatic polycarbonate polarizing lens, an Iupilon Pola sheet having the thickness of 0.6 mm (Mitsubishi Gas Chemical Co., Inc.) was used. For the stretched polycarbonate polarizing sheet, an aromatic polycarbonate sheet having a thickness of 0.3 mm and a retardation value of 5500 nm was used as a protection layer on the surfaces of the polarizing film, and in the case of the polarizing sheet, a coloring interference stripe is not easily generated in the curving process. Both the stretch axis of the polarizing film and the stretch axis of the aromatic polycarbonate sheet of the stretched polycarbonate polarizing sheet are in the horizontal direction of the polarizing lens.

(b) Aromatic Polycarbonate Polarizing Lens

The stretched polycarbonate polarizing sheet of (a) was punched into a strip shape by a die, whose basic shape is a true circle having a diameter of 79.5 mm, and by which the width in the vertical direction is cut to 55 mm, and the curving process was carried out using a mold having a base curve of 7.95 (curvature radius 66.67 mm). In the curving process, forming was carried out under the following conditions: mold temperature: 150° C., preheating time: 30 seconds, and retention time: 90 seconds.

The base curve as used herein refers to a curvature of the front surface of the lens, and it is a value obtained by dividing 530 by the curvature radius (unit of millimeter).

Next, it was inserted in a mold for injection molding, and a melt resin was injected to the concave surface of the lens to be molded, thereby preparing an aromatic polycarbonate polarizing lens. At the time of injection molding, a mold having a base curve of 7.932 (curvature radius 66.81 mm), by which 2 aromatic polycarbonate polarizing lenses can be simultaneously formed at one injection, was used, and forming was carried out under the following conditions: measurement value: 42 mm, cylinder temperature: 300° C., mold temperature: 120° C., injection velocity: 25 mm, pressure keeping: 60 MPa, and V-P switching position: 8 mm.

Further, the heating treatment was carried out at 120° C. for 1 hour using a forced hot air circulation-type oven. This heating treatment corresponds to the condition for burning a hard coat in the prior art.

(c) Measurement of Curvature Radius and Base Curve of the Formed Polarizing Lens Regarding the aromatic polycarbonate polarizing lens formed in (b), the curvature radius in the horizontal direction and the curvature radius in the vertical direction were measured using a three-point curve gauge (DIAL GAUGE manufactured by PEACOCK).

(d) Measurement of Resolution of the Formed Polarizing Lens

Regarding the aromatic polycarbonate polarizing lens formed in (b), the resolution was measured according to the method described in "14.10 Refractive Power, Resolving Power and Astigmatism Tests" in the American Standard ANSI-Z87.1. The lower limit of the measurement range of resolution is 12, and the upper limit thereof is 48 or 56.

Regarding the aromatic polycarbonate polarizing lens formed in (b), values obtained by subtracting the base curve in the vertical direction from the base curve in the horizontal direction (hereinafter referred to as the difference in base curve) and results of the measurement of the resolution are shown in Table 1 (Sample No. [1]). Note that regarding the base curve and the resolution, the average value of 6 samples is described, and a blank means that the measurement was not conducted.

The base curve anisotropy was 0.49 after injection molding and 0.26 after the heat treatment. Further, the resolution was less than 12 at both the points.

TABLE 1

| | | Direction of stretch axis of aromatic polycarbonate sheet | | | After injection molding | | | | After heat treatment | | | |
|---|---|---|---|---|---|---|---|---|---|---|---|---|
| | | | | | Base curve | | Difference | | Base curve | | Difference | |
| | Sample No. | Convex side | Concave side | Punched shape | Horizontal direction | Vertical direction | of base curve | Resolution | Horizontal direction | Vertical direction | of base curve | Resolution |
| Comparative Example 1 | [1] | Parallel | Parallel | Strip | 8.06 | 7.57 | 0.49 | less than 12 | 7.93 | 7.67 | 0.26 | less than 12 |
| Example 1 | [2] | Vertical | Parallel | Round | 7.74 | 7.79 | −0.05 | 20 or more | 7.68 | 7.64 | 0.04 | 20 or more |
| | [3] | | | Strip | 7.89 | 7.80 | 0.09 | 20 or more | 8.16 | 7.51 | 0.65 | less than 12 |
| Example 2 | [4] | Parallel | Vertical | Round | 7.91 | 7.64 | 0.27 | | 7.53 | 7.78 | −0.25 | |
| | [5] | | | Strip | 7.97 | 7.71 | 0.26 | | 7.84 | 7.86 | −0.02 | 20 or more |

Example 1

(e) Aromatic Polycarbonate Polarizing Lens

To both the surfaces of a polarizing film, an aromatic polycarbonate sheet having a thickness of 0.3 mm and a retardation value of 5500 nm, as a protection layer, was attached by an adhesive so that the stretch axis of the convex side of the lens was in the vertical direction of the polarizing lens and the stretch axis of the concave side of the lens was in the horizontal direction of the polarizing lens, thereby providing a stretched polycarbonate polarizing sheet.

The stretched polycarbonate polarizing sheet was processed as in the case of (b), and the measurement was carried out as in the cases of (c) and (d).

Further, the stretched polycarbonate polarizing sheet was punched into a round shape having a true circle with a diameter of 79.5 mm. The curving process was carried out in a manner similar to that in (b), except that the first curving process was carried out using a mold having a base curve of 5.95 (curvature radius 89.08 mm) under the following conditions: mold temperature: 153° C.; and retention time: 90 seconds, and the second curving process was carried out using a mold having a base curve of 7.95 (curvature radius 66.67 mm) under the following conditions: mold temperature: 153° C.; and retention time: 120 seconds. Then, the base curve was measured in a manner similar to that in (c). Further, the resolution was measured in a manner similar to that in (d), but at that time, the measurement was not carried out in the case of a value more than 20.

Regarding the aromatic polycarbonate polarizing lens formed in (e), the difference in base curve and results of the measurement of the resolution are shown in Table 1 (Sample Nos. [2] and [3]). Note that regarding the base curve and the resolution, the average value of 6 samples is described.

Regarding the round shape, the base curve anisotropy was 0.05 after injection molding and 0.04 after the heat treatment. Further, the resolution was 20 or more at both the points. Regarding the strip shape, the base curve anisotropy was 0.09 after injection molding and 0.65 after the heat treatment. Further, the resolution was 20 or more after injection molding and less than 12 after the heat treatment.

Example 2

(f) Aromatic Plycarbonate Polarizing Lens

To both the surfaces of a polarizing film, an aromatic polycarbonate sheet having a thickness of 0.3 mm and a retardation value of 5500 nm, as a protection layer, was attached by an adhesive so that the stretch axis of the convex side of the lens was in the horizontal direction of the polarizing lens and the stretch axis of the concave side of the lens was in the vertical direction of the polarizing lens, thereby providing a stretched polycarbonate polarizing sheet.

The stretched polycarbonate polarizing sheet was processed and the measurement was carried out in a manner similar to that in (e).

Regarding the aromatic polycarbonate polarizing lens formed in (f), the difference in base curve and results of the measurement of the resolution are shown in Table 1 (Sample Nos. [4] and [5]). Note that regarding the base curve and the resolution, the average value of 6 samples is described.

Regarding the round shape, the base curve anisotropy was 0.27 after injection molding and 0.25 after the heat treatment.

Regarding the strip shape, the base curve anisotropy was 0.26 after injection molding and 0.02 after the heat treatment, and the resolution was 20 or more after injection molding. Both in the cases of the round shape and the strip shape, the base curve anisotropy after injection molding exceeded 0.25, but in half of the 6 samples in each case, the base curve anisotropy was 0.25 or less.

Comparative Example 2

The same stretched polycarbonate polarizing sheet as that in (a) was punched into a round shape having a true circle with a diameter of 79.5 mm. The first curving process was carried out using a mold having a base curve of 5.95 (curvature radius 89.08 mm) under the following conditions: mold temperature: 145° C.; preheating time: 25 seconds; and retention time: 120 seconds. The second curving process was carried out using a mold having a base curve of 7.95 (curvature radius 66.67 mm) under the following conditions: mold temperature: 148° C.; preheating time: 40 seconds; and retention time: 240 seconds.

Further, the same stretched polycarbonate polarizing sheet as that in (a) was punched into a strip shape by a die, whose basic shape is a true circle having a diameter of 79.5 mm, and by which the width in the vertical direction is cut to 55 mm, and the curving process was carried out using a mold having a base curve of 7.95 (curvature radius 66.67 mm) under the following conditions: mold temperature: 148° C.; preheating time: 40 seconds; and retention time: 960 seconds.

Next, injection molding and heat treatment were carried out in a manner similar to that in (b), and after that, the base curve in the horizontal direction and the base curved in the vertical direction were measured using a sensing pin-type contour measurement apparatus (CONTOURECORD 2700SD3 manufactured by TOKYO SEIMITSU CO., LTD.). In the case of the contour measurement apparatus, the load applied to a product to be measured at the time of measurement is significantly low compared to the curve gauge in (c), and therefore, the base curve can be more accurately measured.

After that, the resolution was measured in a manner similar to that in (d).

The difference in base curve and results of the measurement of the resolution are shown in Table 2 (Sample Nos. [6] and [7]). Note that regarding the base curve and the resolution, the average value of 3 samples is described.

Regarding the round shape, the base curve anisotropy was 0.55 after injection molding and 0.28 after the heat treatment. Further, the resolution was less than 12 after injection molding and 18 after the heat treatment.

Regarding the strip shape, the base curve anisotropy was 0.68 after injection molding and 0.63 after the heat treatment. Further, the resolution was less than 12 after injection molding and after the heat treatment.

TABLE 2

| | Sample No. | Direction of stretch axis of aromatic polycarbonate sheet | | Punched shape | After injection molding | | | | After heat treatment | | | |
|---|---|---|---|---|---|---|---|---|---|---|---|---|
| | | | | | Base curve | | Difference of base curve | Resolution | Base curve | | Difference of base curve | Resolution |
| | | Convex side | Concave side | | Horizontal direction | Vertical direction | | | Horizontal direction | Vertical direction | | |
| Comparative Example 2 | [6] | Parallel | Parallel | Round | 8.21 | 7.66 | 0.55 | less than 12 | 8.03 | 7.75 | 0.28 | 18 |
| | [7] | | | Strip | 8.33 | 7.65 | 0.68 | less than 12 | 8.30 | 7.67 | 0.63 | less than 12 |

TABLE 2-continued

| | | Direction of stretch axis of aromatic polycarbonate sheet | | | After injection molding | | | | After heat treatment | | | |
|---|---|---|---|---|---|---|---|---|---|---|---|---|
| | | | | | Base curve | | Difference | | Base curve | | Difference | |
| | Sample No. | Convex side | Concave side | Punched shape | Horizontal direction | Vertical direction | of base curve | Resolution | Horizontal direction | Vertical direction | of base curve | Resolution |
| Example 3 | [8] | Parallel | Vertical | Round | 8.06 | 7.82 | 0.24 | 28 | 7.84 | 8.00 | −0.16 | 27 |
| | [9] | | | Strip | 8.22 | 7.75 | 0.47 | less than 12 | 8.13 | 7.84 | 0.29 | less than 12 |
| Example 4 | [10] | Vertical | Parallel | Round | 7.89 | 7.94 | −0.05 | 34 | 7.94 | 7.80 | 0.14 | 22 |
| | [11] | | | Strip | 7.98 | 8.01 | −0.03 | 17 | 8.14 | 7.82 | 0.32 | 12 |
| Example 5 | [12] | Vertical | Vertical | Round | 7.75 | 8.08 | −0.33 | 19 | 7.73 | 8.04 | −0.31 | 31 |
| | [13] | | | Strip | 7.92 | 8.04 | −0.12 | 25 | 7.97 | 8.00 | −0.03 | 16 |
| Example 6 | [14] | Vertical | (Non-stretched) | Round | 7.83 | 8.01 | −0.18 | 34 | 7.86 | 7.89 | −0.03 | 34 |
| | [15] | | | Strip | 7.95 | 8.02 | −0.07 | 27 | 8.06 | 7.92 | 0.14 | less than 12 |

Example 3

To both the surfaces of a polarizing film, an aromatic polycarbonate sheet having a thickness of 0.3 mm and a retardation value of 5500 nm, as a protection layer, was attached by an adhesive so that the stretch axis of the convex side of the lens was in the horizontal direction of the polarizing lens and the stretch axis of the concave side of the lens was in the vertical direction of the polarizing lens, thereby providing a stretched polycarbonate polarizing sheet.

An aromatic polycarbonate polarizing lens was formed and the measurement was carried out in a manner similar to that in Comparative Example 2.

The difference in base curve and results of the measurement of the resolution are shown in Table 2 (Sample Nos. [8] and [9]). Note that regarding the base curve and the resolution, the average value of 3 samples is described.

Regarding the round shape, the base curve anisotropy was 0.24 after injection molding and 0.16 after the heat treatment. Further, the resolution was 28 after injection molding and 27 after the heat treatment.

Regarding the strip shape, the base curve anisotropy was 0.47 after injection molding and 0.29 after the heat treatment. The resolution was less than 12 after injection molding and 18 after the heat treatment.

Example 4

To both the surfaces of a polarizing film, an aromatic polycarbonate sheet having a thickness of 0.3 mm and a retardation value of 5500 nm, as a protection layer, was attached by an adhesive so that the stretch axis of the convex side of the lens was in the vertical direction of the polarizing lens and the stretch axis of the concave side of the lens was in the horizontal direction of the polarizing lens, thereby providing a stretched polycarbonate polarizing sheet.

An aromatic polycarbonate polarizing lens was formed and the measurement was carried out in a manner similar to that in Comparative Example 2.

The difference in base curve and results of the measurement of the resolution are shown in Table 2 (Sample Nos. [10] and [11]). Note that regarding the base curve and the resolution, the average value of 3 samples is described.

Regarding the round shape, the base curve anisotropy was 0.05 after injection molding and 0.14 after the heat treatment. Further, the resolution was 34 after injection molding and 22 after the heat treatment.

Regarding the strip shape, the base curve anisotropy was 0.03 after injection molding and 0.32 after the heat treatment. Further, the resolution was 17 after injection molding and 12 after the heat treatment.

Example 5

To both the surfaces of a polarizing film, an aromatic polycarbonate sheet having a thickness of 0.3 mm and a retardation value of 5500 nm, as a protection layer, was attached by an adhesive so that the stretch axis of the convex side of the lens was in the vertical direction of the polarizing lens and the stretch axis of the concave side of the lens was also in the vertical direction of the polarizing lens, thereby providing a stretched polycarbonate polarizing sheet.

An aromatic polycarbonate polarizing lens was formed and the measurement was carried out in a manner similar to that in Comparative Example 2.

The difference in base curve and results of the measurement of the resolution are shown in Table 2 (Sample Nos. [12] and [13]). Note that regarding the base curve and the resolution, the average value of 3 samples is described.

Regarding the round shape, the base curve anisotropy was 0.33 after injection molding and 0.31 after the heat treatment. Further, the resolution was 19 after injection molding and 31 after the heat treatment.

Regarding the strip shape, the base curve anisotropy was 0.12 after injection molding and 0.03 after the heat treatment. Further, the resolution was 25 after injection molding and 16 after the heat treatment.

Example 6

To the convex side of a polarizing film, an aromatic polycarbonate sheet having a thickness of 0.3 mm and a retardation value of 5500 nm, as a protection layer, was attached by an adhesive so that the stretch axis was in the vertical direction of the polarizing lens, and to the concave side of the polarizing film, a non-stretched aromatic polycarbonate sheet having a thickness of 0.3 mm and a retardation value of 100 nm or less, as a protection layer, was attached by an adhesive, thereby providing a one-side stretched polycarbonate polarizing sheet to be used.

An aromatic polycarbonate polarizing lens was formed and the measurement was carried out in a manner similar to that in Comparative Example 2.

The difference in base curve and results of the measurement of the resolution are shown in Table 2 (Sample Nos. [14] and [15]). Note that regarding the base curve and the resolution, the average value of 3 samples is described.

Regarding the round shape, the base curve anisotropy was 0.18 after injection molding and 0.03 after the heat treatment. Thus, both the values were 0.25 or less. Further, the resolution was 34 after injection molding and after the heat treatment.

Regarding the strip shape, the base curve anisotropy was 0.07 after injection molding and 0.14 after the heat treatment. Further, the resolution was 27 after injection molding and less than 12 after the heat treatment.

As clearly understood from the working examples, in the case of the conventional aromatic polycarbonate polarizing lens, the base curve anisotropy is 0.25 or more and a product having high shape precision cannot be obtained at all, whereas in the case of the aromatic polycarbonate polarizing lens of the present invention, a product having the base curve anisotropy of 0.25 or less and high shape precision can be obtained in either the case of the round shape or the case of the strip shape, or in both the cases.

Further, as clearly understood from the working examples, in the case of the conventional aromatic polycarbonate polarizing lens, the resolution is less than 20 and a product which satisfies the American Standard ANSI-Z87.1 cannot be obtained at all, whereas in the case of the aromatic polycarbonate polarizing lens of the present invention, a product having the resolution of 20 or more can be obtained in either the case of the round shape or the case of the strip shape.

In the case of the aromatic polycarbonate polarizing lens of the present invention, the resolution of the round shape is high after injection molding and after the heat treatment, and even after the heat treatment in Example 5 [12] in which the base curve anisotropy was well over 0.1 and exceeded 0.25, the resolution obtained was 20 or more. Further, after injection molding in Example 5 [12], the base curve anisotropy exceeded 0.25, but the resolution was 19 and within the range of slightly less than 20.

Further, in the case of the aromatic polycarbonate polarizing lens of the present invention, the base curve anisotropy of the strip shape is small, and in Examples 4-6, products having the base curve anisotropy of 0.25 or less and high shape precision were obtained. After the heat treatment in Example 4 [11], the base curve anisotropy exceeded 0.25, but was 0.32 and within the range of slightly over 0.25.

EXPLANATIONS OF LETTERS OR NUMERALS 1 polarizing film
2, 3 aromatic polycarbonate sheet
4, 5 adhesive layer
6 aromatic polycarbonate

The invention claimed is:

1. A polarizing lens, which is formed by laminating an aromatic polycarbonate protection layer through an adhesive layer to each surface of a film having polarizing properties, curving the resultant laminate so as to form a light incidence side having the protection layer positioned thereon and to impart spherical or aspherical surfaces thereto to obtain a polarizing sheet, and injecting an aromatic polycarbonate onto a surface opposite the light incidence side of the polarizing sheet to form a sheet of the injected aromatic polycarbonate, wherein a retardation value of the protection layer positioned on the light incidence side is 2,000 nm or more and less than 20,000 nm, and wherein a stretch axis of the protection layer positioned on the light incidence side is perpendicular to an absorption axis of the film having polarizing properties, and wherein said laminated aromatic polycarbonate sheet the aromatic polycarbonate in the protection layers is prepared from 2,2-bis(4-hydroxyphenyl)propane.

2. A polarizing lens, which is formed by laminating an aromatic polycarbonate protection layer through an adhesive layer to each surface of a film having polarizing properties, curving the resultant laminate so as to form a light incidence side having the protection layer positioned thereon and a light exit side having the protection layer positioned thereon and to impart spherical or aspherical surfaces thereto to obtain a polarizing sheet, and injecting an aromatic polycarbonate onto a surface of the light exit side of the polarizing sheet to form a sheet of the injected aromatic polycarbonate, wherein a retardation value of the protection layer positioned on the light incidence side and a retardation value of the protection layer positioned on the light exit side are 2,000 nm or more and less than 20,000 nm, wherein a stretch axis of the protection layer positioned on the light incidence side is parallel to an absorption axis of the film having the polarizing properties, and wherein a stretch axis of the aromatic polycarbonate sheet as a protective layer positioned at the light exit side is perpendicular to the absorption axis of the film having the polarizing properties, and wherein the aromatic polycarbonate in the protection layers is prepared from from 2,2-bis(4-hydroxyphenyl)propane.

* * * * *